(12) United States Patent
Wehrmann et al.

(10) Patent No.: US 10,669,418 B2
(45) Date of Patent: Jun. 2, 2020

(54) POLYCARBONATE COMPOSITIONS CONTAINING POLYGLYCIDYL ETHER

(71) Applicant: Covestro Deutschland AG, Leverkusen (DE)

(72) Inventors: Rolf Wehrmann, Krefeld (DE); Helmut Werner Heuer, Siegen (DE); Anke Boumans, Goch (DE)

(73) Assignee: Covestro Deutschland AG, Leverkusen (DE)

( * ) Notice: Subject to any disclaimer, the term of this patent is extended or adjusted under 35 U.S.C. 154(b) by 38 days.

(21) Appl. No.: 16/061,023

(22) PCT Filed: Dec. 8, 2016

(86) PCT No.: PCT/EP2016/080287
§ 371 (c)(1),
(2) Date: Jun. 11, 2018

(87) PCT Pub. No.: WO2017/097915
PCT Pub. Date: Jun. 15, 2017

(65) Prior Publication Data
US 2018/0355167 A1    Dec. 13, 2018

(30) Foreign Application Priority Data

Dec. 11, 2015   (EP) ..................... 15199615

(51) Int. Cl.
*C08L 69/00*    (2006.01)
*C08K 5/1515*   (2006.01)

(52) U.S. Cl.
CPC ............ *C08L 69/00* (2013.01); *C08K 5/1515* (2013.01)

(58) Field of Classification Search
None
See application file for complete search history.

(56) References Cited

U.S. PATENT DOCUMENTS

| | | |
|---|---|---|
| 2,991,273 A | 7/1961 | Hechelhammer et al. |
| 2,999,825 A | 9/1961 | Floyd et al. |
| 2,999,846 A | 9/1961 | Schnell et al. |
| 3,028,635 A | 4/1962 | Herubel |
| 3,148,172 A | 9/1964 | Fox |
| 3,271,367 A | 9/1966 | Schnell et al. |
| 3,839,247 A * | 10/1974 | Bialous ............... C08K 5/1515 524/114 |
| 3,879,348 A | 4/1975 | Serini et al. |
| 3,945,967 A | 3/1976 | Jaquiss |
| 4,722,955 A | 2/1988 | Dick |
| 4,982,014 A | 1/1991 | Freitag et al. |
| 5,132,154 A | 7/1992 | Westeppe et al. |
| 5,288,778 A * | 2/1994 | Schmitter ............ C08K 5/3492 524/100 |
| 5,821,380 A | 10/1998 | Holderbaum et al. |
| 5,859,073 A | 1/1999 | Pfaendner et al. |
| 5,883,165 A | 3/1999 | Kröhnke et al. |
| 2011/0092643 A1* | 4/2011 | Frijns .................... C08G 18/44 524/612 |

FOREIGN PATENT DOCUMENTS

| | | |
|---|---|---|
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 3832396 A1 | 2/1990 |
| DE | 3918406 A1 | 12/1990 |
| DE | 102004020673 A1 | 12/2005 |
| EP | 0500496 A1 | 8/1992 |
| EP | 0718367 A2 | 6/1996 |
| EP | 0812884 A2 | 12/1997 |
| EP | 0839623 A1 | 5/1998 |
| EP | 0953605 A2 | 11/1999 |
| FR | 1561518 A | 3/1969 |
| GB | 1122003 A | 7/1968 |
| GB | 1229482 A | 4/1971 |
| GB | 1367790 A | 9/1974 |
| WO | WO-9615102 A2 | 5/1996 |

OTHER PUBLICATIONS

International Search Report for PCT/EP2016/080287 dated Feb. 21, 2017.
Written Opinion of the International Searching Authority for PCT/EP2016/080287 dated Feb. 21, 2017.

* cited by examiner

*Primary Examiner* — Robert T Butcher
(74) *Attorney, Agent, or Firm* — Faegre Drinker Biddle & Reath LLP

(57) ABSTRACT

The invention relates to polycarbonate compositions having high flowability and good thermal properties, comprising specific glycidyl ether compounds and typically at least one additive from the group of the thermal stabilizers, UV stabilizers and/or demoulding agents, and to mouldings made from these compositions. The polycarbonate compositions have high flowability and good thermal properties. The invention also relates to the improvement in the flowability of polycarbonate melts.

11 Claims, No Drawings

POLYCARBONATE COMPOSITIONS CONTAINING POLYGLYCIDYL ETHER

CROSS-REFERENCE TO RELATED APPLICATIONS

This application is a national stage application (under 35 U.S.C. § 371) of PCT/EP2016/080287, filed Dec. 8, 2016, which claims benefit of European Application No. 15199615.4, filed Dec. 11, 2015, both of which are incorporated herein by reference in their entirety.

The present invention relates to polycarbonate compositions comprising specific glycidyl ether compounds and typically at least one additive from the group of the thermal stabilizers, UV stabilizers and/or demoulding agents, and to mouldings produced from these compositions. The polycarbonate compositions have high flowability and good thermal properties. The invention also relates to the improvement in the flowability of polycarbonate melts.

BACKGROUND OF THE INVENTION

The flowability of (co)polycarbonate compositions or (co)polycarbonate blends can be increased by the addition of low molecular weight compounds. Since substances of this kind, however, simultaneously act as plasticizers, they lower the heat distortion resistance and glass transition temperature of the polymer matrix. This in turn is undesirable, since this reduces the temperature use range of the materials.

DE 102004020673 A1 describes copolycarbonates having improved flowability, based on bisphenols having an ether or thioether linkage.

DE 3918406 A1 discloses blends for optical data storage means, based on a specific polycarbonate with elastomers or other thermoplastics, and the use thereof in optical applications, specifically optical data storage means such as compact discs.

EP 0 953 605 A2 describes linear polycarbonate compositions having improved flow characteristics, characterized in that cyclic oligocarbonates are added in large amounts, for example 0.5% to 4%, and are homogenized in the matrix of a linear BPA polycarbonate at 285° C. by means of a twin-shaft extruder. In the course of this, the flowability increases as the amount of cyclic oligocarbonates rises. At the same time, however, there is a distinct decrease in the glass transition temperature and hence the heat distortion resistance. This is undesirable in the industrial applications of (co)polycarbonate compositions having relatively high heat distortion resistance. This disadvantage then has to be compensated for through the use of higher amounts of costly co-bisphenols.

BRIEF SUMMARY OF THE INVENTION

It was thus an object of the present invention to provide polycarbonate compositions having high flowability and very substantially unchanged thermal and mechanical properties (e.g. glass transition temperature), without having the disadvantages of the compositions known from the prior art, for example inadequate flow characteristics in processing. At the same time, the polycarbonate compositions according to the invention should have good melt stabilities, which is important for the production of extruded or injection moulded parts in a production process.

Surprisingly, it has now been found that this object is achieved by a composition comprising A) 64.0 wt % to 99.94 wt % of aromatic polycarbonate, and B) 0.05 to 3.0 wt % of at least one polyglycidyl ether compound of the formula (I)

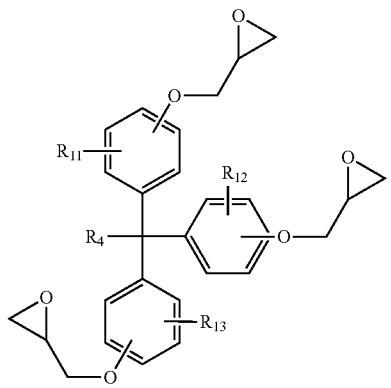

in which $R_4$ is a $C_1$- to $C_8$-alkyl group or an aryl group, where the alkyl group is branched or unbranched, and $R_{11}$ to $R_{13}$ are the same or different and are H, $C_1$- to $C_8$-alkyl radicals or aryl radicals, where the alkyl radicals are branched or unbranched.

The object is additionally achieved by mouldings produced from such a composition.

DETAILED DESCRIPTION OF THE INVENTION

The compositions according to the invention feature good mechanical properties, especially good impact resistance, determined according to ISO 180/1C:2000-12, and very good rheological characteristics, i.e. high flowability, expressed by the melt volume flow rate MVR, determined according to ISO 1133-1:2011-12. At the same time, melt stability is high.

Preferably, the compositions according to the invention further include 0.001 wt % to 3 wt % of at least one additive from the group of the thermal stabilizers, UV stabilizers and/or demoulding agents (component C).

The compositions according to the invention may also contain up to 30.0 wt %, preferably 0.10 to 25 wt %, more preferably 0.2 to 20 wt %, of other customary additives ("further additives", component D). These further additives do not form part of the groups of the thermal stabilizers, UV stabilizers and demoulding agents. Examples of component D are flame retardants, IR absorbers, antistats and inorganic fillers such as glass fibres, carbon fibres, titanium dioxide, silicates, barium sulphate and talc.

Very particularly preferred composition do not contain any further components aside from components A) to D).

The individual constituents of the compositions according to the invention are more particularly elucidated hereinbelow:

Definitions $C_1$- to $C_8$-Alkyl, branched or unbranched, is understood in the context of the invention to mean an alkyl group having 1 to 8 carbon atoms. $C_1$- to $C_4$-Alkyl is, for example, methyl, ethyl, n-propyl, isopropyl, n-butyl, sec-butyl, tert-butyl, $C_1$- to $C_6$-alkyl is additionally, for example, n-pentyl, 1-methylbutyl, 2-methylbutyl, 3-methylbutyl, neopentyl, 1-ethylpropyl, n-hexyl, 1,1-dimethylpropyl, 1,2-dimethylpropyl, 1,3-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-3-methylpropyl, and $C_1$- to $C_8$-alkyl is additionally, for example, n-heptyl or n-octyl. The same applies to the corresponding alkyl radical in aralkyl radicals.

Aryl is a carbocyclic aromatic radical having 6 to 34 skeleton carbon atoms. Preferred examples of $C_6$- to $C_{24}$-aryl include phenyl, o-, p-, m-tolyl, naphthyl, phenanthrenyl, anthracenyl and fluorenyl. Arylene is an aryl as defined above having two bonds. The same applies to the aromatic moiety of an arylalkyl radical, also called aralkyl radical.

The above lists are illustrative and should not be regarded as limiting.

In the context of the present invention, ppb and ppm are understood to mean parts by weight unless stated otherwise.

In the context of the present invention, the stated percentages by weight of components A and B and of the optionally present components C and D—unless explicitly stated otherwise—are each based on the total weight of the composition. The composition may contain further components as well as components A and B and the optionally present components C and D. In a preferred embodiment, the composition consists of components A, B, C and D; in other words, components A, B, C and D add up to 100% by weight.

Component A

Polycarbonates in the context of the present invention are both homopolycarbonates and copolycarbonates. The polycarbonates may be linear or branched in known fashion.

According to the invention, it is also possible to use mixtures of polycarbonates.

The polycarbonates have mean molecular weights $M_w$ (determined by measuring the relative viscosity at 25° C. in $CH_2Cl_2$ and a concentration of 0.5 g per 100 ml of $CH_2Cl_2$) of preferably 15 000 g/mol to 36 000 g/mol, more preferably of 16 000 g/mol to 35 000 g/mol, especially of 17 000 g/mol to 34 000 g/mol, determined by bisphenol A polycarbonate calibration.

The polycarbonates are prepared in a known manner from dihydroxyaryl compounds, carbonic acid derivatives, and optionally chain terminators and branching agents.

Particulars pertaining to the preparation of polycarbonates are disclosed in many patent documents spanning approximately the last 40 years. Reference may be made here to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume II, Second Edition, 1988, pages 648-718 and finally to U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299.

Aromatic polycarbonates are prepared, for example, by reaction of dihydroxyaryl compounds with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents. Preparation via a melt polymerization process by reaction of dihydroxyaryl compounds with, for example, diphenyl carbonate is likewise possible.

Dihydroxyaryl compounds suitable for the production of polycarbonates are for example hydroquinone, resorcinol, dihydroxydiphenyls, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α,α'-bis(hydroxyphenyl)diisopropylbenzenes, phthalimidines derived from derivatives of isatin or phenolphthalein and the ring-alkylated, ring-arylated and ring-halogenated compounds thereof.

Preferred dihydroxyaryl compounds are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane, and bisphenols (I) to (III)

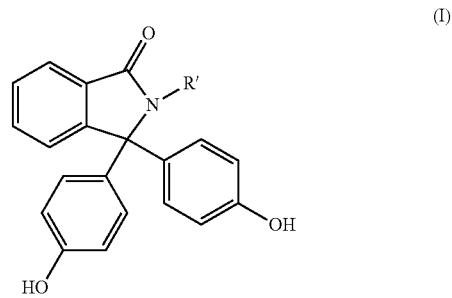

(I)

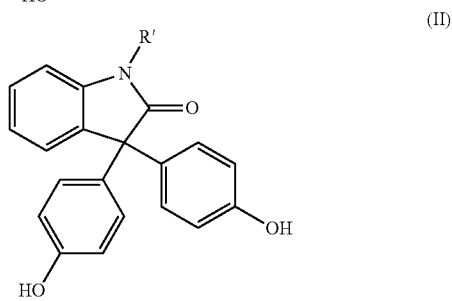

(II)

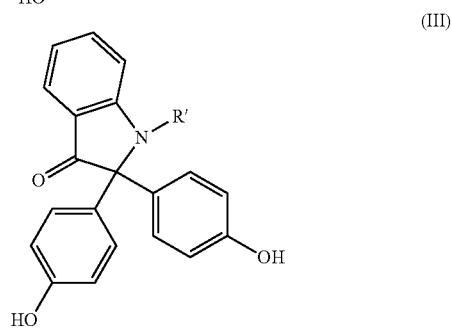

(III)

in which R' in each case is $C_1$- to $C_4$-alkyl, aralkyl or aryl, preferably methyl or phenyl, most preferably methyl.

Particularly preferred dihydroxyaryl compounds are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and 2,2-bis(3-methyl-4-hydroxyphenyl)propane, and the dihydroxyaryl compounds of the formulae (I), (II) and (III).

These and other suitable dihydroxyaryl compounds are described for example in U.S. Pat. Nos. 3,028,635, 2,999,825, 3,148,172, 2,991,273, 3,271,367, 4,982,014 and 2,999,846, in DE-A 1 570 703, DE-A 2 063 050, DE-A 2 036 052, DE-A 2 211 956 and DE-A 3 832 396, in FR-A 1 561 518, in the monograph H. Schnell, "Chemistry and Physics of Polycarbonates", Interscience Publishers, New York 1964.

In the case of homopolycarbonates only one dihydroxyaryl compound is used; in the case of copolycarbonates two or more dihydroxyaryl compounds are used.

Examples of suitable carbonic acid derivatives include phosgene or diphenyl carbonate.

Suitable chain terminators that may be used in the production of polycarbonates are monophenols. Suitable monophenols are for example phenol itself, alkylphenols such as cresols, p-tert-butylphenol, cumylphenol and mixtures thereof.

Preferred chain terminators are the phenols mono- or polysubstituted by linear or branched $C_1$- to $C_{30}$-alkyl radicals, preferably unsubstituted or substituted by tert-butyl. Particularly preferred chain terminators are phenol, cumylphenol and/or p-tert-butylphenol.

The amount of chain terminator to be used is preferably 0.1 to 5 mol %, based on moles of dihydroxyaryl compounds used in each case. The chain terminators can be added before, during or after the reaction with a carbonic acid derivative.

Suitable branching agents are the trifunctional or more than trifunctional compounds familiar in polycarbonate chemistry, in particular those having three or more than three phenolic OH groups.

Examples of suitable branching agents include 1,3,5-tri (4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl) methane, tetra(4-(4-hydroxyphenylisopropyl)phenoxy) methane and 1,4-bis((4',4"-dihydroxytriphenyl)methyl) benzene and 3,3-bis(3-methyl-4-hydroxyphenyl)-2-oxo-2,3-dihydroindole.

The amount of the branching agents for optional employment is preferably 0.05 mol % to 2.00 mol %, based on moles of dihydroxyaryl compounds used in each case.

The branching agents can either be initially charged together with the dihydroxyaryl compounds and the chain terminators in the aqueous alkaline phase or added dissolved in an organic solvent before the phosgenation. In the case of the transesterification process the branching agents are used together with the dihydroxyaryl compounds.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane, and homo- or copolycarbonates derived from the dihydroxyaryl compounds of the formulae (I) to (III)

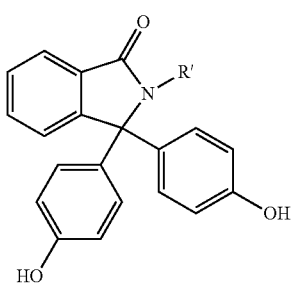

(I)

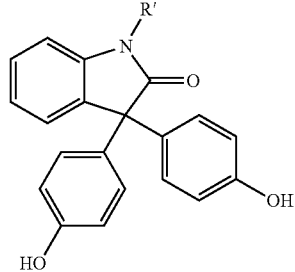

(II)

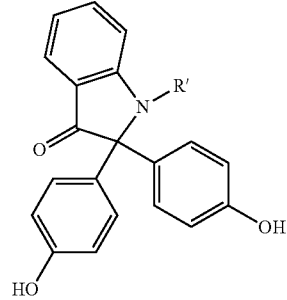

(III)

in which R' in each case is $C_1$- to $C_4$-alkyl, aralkyl or aryl, preferably methyl or phenyl, most preferably methyl, preferably with bisphenol A as comonomer.

To facilitate incorporation of additives component A is preferably employed in the form of powders, pellets or mixtures of powders and pellets.

Compositions according to the invention contain 64.0 to 99.94 wt %, preferably 70.0 to 99.94 wt %, more preferably 80.0 to 99.90 wt %, most preferably to 79.949 wt %, of at least one aromatic polycarbonate.

Component B

The polyglycidyl ether compounds of component B are those of the general formula (I)

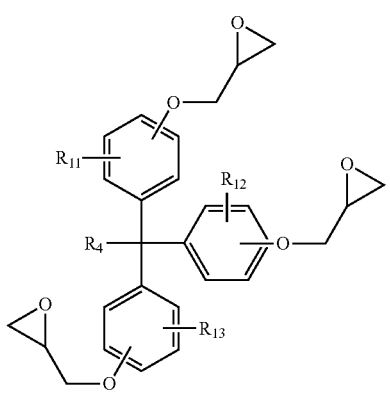

(1)

in which $R_4$ is a $C_1$- to $C_8$-alkyl group or an aryl group, where the alkyl group is branched or unbranched, and $R_{11}$ to $R_{13}$ are the same or different and are H, $C_1$- to $C_8$-alkyl radicals or aryl radicals, where the alkyl radicals are branched or unbranched.

A most preferred polyglycidyl ether present alone or in a mixture with other polyglycidyl ethers of the formula (1) in compositions according to the invention is a polyglycidyl ether of the formula (2) (THPE trisglycidyl ether, trisglycidyl ether of 1,1,1-tris(p-hydroxyphenyl)ethane):

(2)

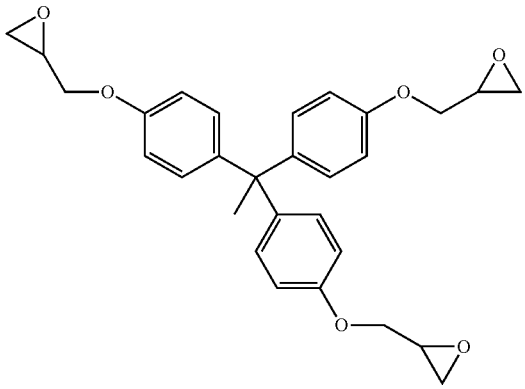

Compositions according to the invention contain 0.05 to 3.0 wt %, preferably 0.1 to 2.0 wt %, more preferably 0.2 to 1.5 wt % and most preferably 0.3 to 0.8 wt % of at least one polyglycidyl ether compound of the formula (I).

Component C

Preferably, the compositions according to the invention further comprise at least one of the additives of thermal stabilizer, UV stabilizer and/or demoulding agent in a total amount of 0.001 wt % to 3 wt %.

Preferentially suitable thermal stabilizers are triphenylphosphine, tris(2,4-di-tert-butylphenyl) phosphite (Irgafos® 168), tetrakis(2,4-di-tert-butylphenyl)-[1,1-biphenyl]-4,4'-diyl bisphosphonite, octadecyl-3-(3,5-di-tert-butyl-4-hydroxyphenyl) propionate (Irganox® 1076), bis(2,4-dicumylphenyl)pentaerythritol diphosphite (Doverphos® S-9228), bis(2,6-di-tert-butyl-4-methylphenyl)pentaerythritol diphosphite (ADK STAB PEP-36). These or other thermal stabilizers are used alone or in a mixture (for example Irganox® B900 (mixture of Irgafos® 168 and Irganox® 1076 in a 1:3 ratio) or Doverphos® S-92228 with Irganox® B900 or Irganox® 1076). The thermal stabilizers are used alone or in a mixture, preferably in amounts of 0.003 to 0.2 wt %.

UV absorbers used are those compounds which have minimum transmittance below 400 nm and maximum transmittance above 400 nm. Ultraviolet absorbers particularly suitable for use in the composition according to the invention are benzotriazoles, triazines, benzophenones and/or arylated cyanoacrylates.

Particularly suitable ultraviolet absorbers are hydroxybenzotriazoles, such as 2-(3',5'-bis(1,1-dimethylbenzyl)-2'-hydroxyphenyl)benzotriazole (Tinuvin® 234, BASF, Ludwigshafen), 2-(2'-hydroxy-5'-(tert-octyl)phenyl) benzotriazole (Tinuvin® 329, BASF, Ludwigshafen), bis(3-(2H-benzotriazolyl)-2-hydroxy-5-tert-octyl)methane (Tinuvin® 360, BASF, Ludwigshafen), 2-(4,6-diphenyl-1,3,5-triazin-2-yl)-5-(hexyloxy)phenol (Tinuvin®1577, BASF, Ludwigshafen), and also benzophenones such as 2,4-dihydroxybenzophenone (Chimassorb® 22, BASF, Ludwigshafen) and 2-hydroxy-4-(octyloxy)benzophenone (Chimassorb® 81, BASF, Ludwigshafen), 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (Tinuvin® 1600, BASF, Ludwigshafen), tetraethyl 2,2'-(1,4-phenylenedimethylidene)bismalonate (Hostavin® B-Cap, Clariant AG) or N-(2-ethoxyphenyl)-N'-(2-ethylphenyl)ethanediamide (Tinuvin® 312, BASF, Ludwigshafen).

Particularly preferred UV stabilizers are bis(3-(2H-benzotriazolyl)-2-hydroxy-5-tert-octyl)methane (Tinuvin® 360), 2-(2'-hydroxy-5'-(tert-octyl)phenyl)benzotriazole (Tinuvin® 329) and N-(2-ethoxyphenyl)-N'-(2-ethylphenyl) ethanediamide (Tinuvin® 312), very particular preference being given to bis(3-(2H-benzotriazolyl)-2-hydroxy-5-tert-octyl)methane (Tinuvin® 360), 2-(2'-hydroxy-5'-(tert-octyl) phenyl)benzotriazole (Tinuvin® 329).

It is also possible to use mixtures of these ultraviolet absorbers.

If the compositions according to the invention contain UV absorbers, the amount of UV absorber is preferably not more than 0.8 wt %, more preferably 0.05 wt % to 0.5 wt %, most preferably 0.1 wt % to 0.4 wt %, based on the overall composition.

Any demoulding agents added to the compositions according to the invention are preferably selected from the group consisting of pentaerythritol tetrastearate, glycerol monostearate and long-chain fatty acid esters, for example stearyl stearate and propanediol stearate, and mixtures thereof. The demoulding agents are preferably used in amounts of 0.05 wt % to 2.00 wt %, preferably in amounts of 0.1 wt % to 1.0 wt %, more preferably in amounts of 0.15 wt % to 0.60 wt % and most preferably in amounts of 0.20 wt % to 0.50 wt %, based on the overall composition.

More preferably, at least one thermal stabilizer and optionally a demoulding agent is present as component C.

Preferred compositions do not contain any components other than components A to C.

Component D

Optionally present as an alternative are up to 30.0 wt %, preferably 0.10 to 25 wt %, more preferably 0.2 to 20 wt %, of other customary additives ("further additives", component D). These further additives do not form part of the groups of the thermal stabilizers, UV stabilizers and demoulding agents. In this embodiment, the compositions according to the invention preferably consist of components A, B, C and D. Examples of component D are flame retardants, IR absorbers, antistats, transesterification stabilizers such as trisisooctyl phosphate, and inorganic fillers such as glass fibres, carbon fibres, titanium dioxide, silicates, barium sulphate and talc.

Such additives, as customarily added to polycarbonates, are especially the antioxidants, IR absorbers, antistats, flame retardants, anti-dripping agents, optical brighteners, light-scattering agents, colourants such as pigments, including inorganic pigments, carbon black and/or dyes, and inorganic fillers such as titanium dioxide or barium sulphate that are described in EP-A 0 839 623, WO-A 96/15102, EP-A 0 500 496 or "Plastics Additives Handbook", Hans Zweifel, 5th Edition 2000, Hanser Verlag, Munich, in the amounts customary for polycarbonate. These additives may be added singly or else as mixtures.

The polymer compositions according to the invention, comprising components A to C and optionally D, are produced by standard incorporation processes via combination, mixing and homogenization of the individual constituents, especially with the homogenization preferably taking place in the melt under the action of shear forces. Combination and mixing is optionally effected prior to melt homogenization using powder premixes.

It is also possible to use premixes of pellets, or of pellets and powders, with components B to C and optionally D.

It is also possible to use premixes which have been produced from solutions of the mixture components in suitable solvents, in which case homogenization is optionally effected in solution and the solvent is then removed.

In particular, components B to C and optionally D of the composition according to the invention may be introduced into the polycarbonate here by known processes or in the form of a masterbatch.

The use of masterbatches to incorporate components B to C and optionally D—singly or as mixtures—is preferable.

In this context, the composition according to the invention can be combined, mixed, homogenized and subsequently extruded in customary apparatus such as screw extruders (ZSK twin-screw extruders for example), kneaders or Brabender or Banbury mills. After extrusion, the extrudate may be chilled and comminuted. It is also possible to premix individual components and then to add the remaining starting materials individually and/or likewise in a mixture.

It is also possible to combine and mix a premix in the melt in the plastifying unit of an injection-moulding machine. In this case, the melt is converted directly to a shaped body in the subsequent step.

The plastics mouldings are preferably produced by injection moulding.

Compositions according to the invention are suitable for producing multilayer systems. This involves application of the polycarbonate composition according to the invention in one or more layer(s) to a moulded article made from a plastic. Application may be carried out at the same time as or immediately after the moulding of the shaped body, for example by foil insert moulding, coextrusion or multicomponent injection moulding. However, application may also be to the ready-moulded main body, for example by lamination with a film, by encapsulative overmoulding of an existing shaped body or by coating from a solution.

Compositions according to the invention are suitable for production of framework components in the electrics and electronics sector and IT sector, especially for applications which place high demands on flame retardancy. Such applications include, for example, screens or housings, for instance for ultrabooks or frames for LED display technologies, e.g. OLED displays or LCD displays or else for E-ink devices. Further applications are housing parts of mobile communication terminals, such as smartphones, tablets, ultrabooks, notebooks or laptops, but also of navigation devices, smartwatches or heart rate meters, and also for electrical applications in thin-walled designs, for example home and industrial networking systems and smart meter housing components.

Compositions according to the invention are particularly suitable for production of thin-walled mouldings of thickness 0.1 to 3 mm, preferably 0.1 to 2 mm, more preferably 0.1 to 1.0 mm, for the electrics/electronics sector or the IT sector with a UL-94 V-0 flammability class with wall thickness 1.5 mm. The thickness figures in this case do not mean that the moulding has such a thickness within the stated range at every point. Instead, the thicknesses stated relate to the part of the moulding with the lowest wall thickness.

The invention further provides for the use of at least one polyglycidyl ether compound of the formula (I) (component B)

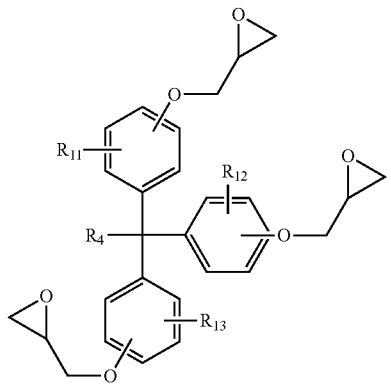

in which $R_4$ is a $C_1$- to $C_8$-alkyl group or an aryl group, where the alkyl group is branched or unbranched, and $R_{11}$ to $R_{13}$ are the same or different and are H, $C_1$- to $C_8$-alkyl radicals or aryl radicals, where the alkyl radicals are branched or unbranched, preferably of

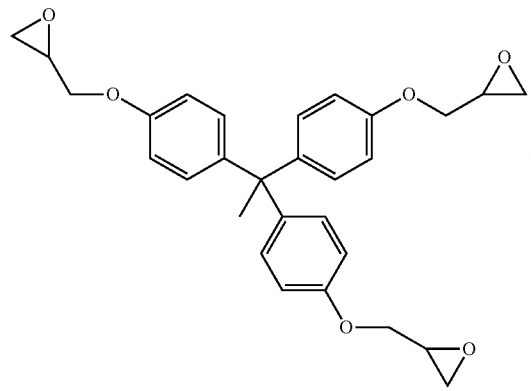

for increasing the melt volume flow rate, determined according to ISO 1133-1:2011-12 at 300° C. with a load of 1.2 kg, of a polycarbonate composition comprising component A, optionally component C and optionally component D. The ranges of preference for components A to C and the optionally present component D that have been mentioned in connection with the polycarbonate composition according to the invention likewise apply to the use according to the invention.

EXAMPLES

The polycarbonate compositions described hereinafter were produced by compounding in a Berstorff ZE 25 extruder with a throughput of 5 kg/h and a screw rotation frequency of 50/min. The shaped bodies were produced in an Arburg Allrounder 370 C injection moulding machine at 280° C.

Component A-1: Thermally stabilized linear polycarbonate based on bisphenol A having a melt volume flow rate MVR of 12.5 cm³/10 min (as per ISO 1133-1:2011-12, at a test temperature of 300° C. with a load of 1.2 kg). Component A-1 contains 0.025 wt % of triphenylphosphine (component C) as thermal stabilizer.

Component A-2: Linear polycarbonate powder based on bisphenol A having a melt volume flow rate MVR of 6 cm³/10 min (as per ISO 1133-1:2011-12, at a test temperature of 300° C. with a load of 1.2 kg).

Component B: Trisglycidyl ether of 1,1,1-tris(p-hydroxyphenyl)ethane from Excel Industries Ltd., India.

Impact resistance was measured at room temperature in accordance with ISO 180/1C:2000-12 on test specimens measuring 80 mm×10 mm×4 mm.

Glass transition temperature was determined by means of DSC (2nd heating).

Melt volume flow rate (MVR) was determined in accordance with ISO 1133-1:2011-12 (at a test temperature of 300° C., mass 1.2 kg) using a Zwick 4106 instrument from Zwick Roell.

Melt viscosities were determined in accordance with ISO 11443:2014-04 (cone-plate arrangement).

2. Compositions

Table 1a: Inventive compositions 4-6 comprising polyglycidyl ether, and comparative examples 1C-3C 1C is the thermally stabilized polycarbonate raw material used.

2C is the re-extruded 1C; this simulates the compounding step for inventive examples 4-6.

TABLE 1a

Inventive compositions 4-6 comprising polyglycidyl ether, and comparative examples 1C-3C

| Formulation | | 1C Pellets | 2C Re-ex | 3C | 4 | 5 | 6 |
|---|---|---|---|---|---|---|---|
| Component A-1[1)] | wt % | 100 | 100 | 93 | 93 | 93 | 93 |
| Component A-2 | wt % | | | 7 | 6.9 | 6.7 | 6.4 |
| Component B | wt % | | | | 0.1 | 0.3 | 0.6 |

[1)]contains triphenylphosphine as component C;

TABLE 1b

Glass transition temperatures, rheological properties and impact resistances of inventive compositions 4-6 comprising polyglycidyl ether, and of comparative examples 1C-3C

| Results | | 1C Pellets | 2C Re-ex | 3C | 4 | 5 | 6 |
|---|---|---|---|---|---|---|---|
| $T_G$ | ° C. | 148.1 | 145.1 | 147.8 | 147.8 | 147.1 | 145.0 |
| MVR 300° C./1.2 kg | cm³/10 min | 12.1 | 12.1 | 11.6 | 13.6 | 16.0 | 16.6 |
| IMVR20' 300° C./1.2 kg | cm³/10 min | 12.1 | 12.4 | 12.0 | 14.3 | 16.0 | 17.2 |
| Delta MVR/IMVR20' | | 0.0 | −0.3 | −0.4 | −0.7 | 0.0 | −0.6 |
| *Melt visc. at 280° C.* | | | | | | | |
| eta 50 | Pa · s | 688 | 651 | 735 | 488 | 468 | |
| eta 100 | Pa · s | 668 | 633 | 672 | 461 | 457 | 456 |
| eta 200 | Pa · s | 619 | 596 | 630 | 446 | 438 | 441 |
| eta 500 | Pa · s | 515 | 499 | 521 | 374 | 383 | 384 |
| eta 1000 | Pa · s | 397 | 391 | 403 | 317 | 312 | 314 |
| eta 1500 | Pa · s | 325 | 321 | 330 | 267 | 264 | 265 |
| eta 5000 | Pa · s | 152 | 151 | 155 | 132 | 131 | 131 |
| *Melt visc. at 300° C.* | | | | | | | |
| eta 50 | Pa · s | 373 | 375 | 404 | 279 | 238 | |
| eta 100 | Pa · s | 370 | 368 | 389 | 277 | 237 | |
| eta 200 | Pa · s | 356 | 353 | 369 | 274 | 236 | 244 |
| eta 500 | Pa · s | 314 | 312 | 322 | 246 | 217 | 226 |
| eta 1000 | Pa · s | 263 | 261 | 268 | 217 | 191 | 198 |
| eta 500 | Pa · s | 226 | 225 | 235 | 192 | 171 | 176 |
| eta 5000 | Pa · s | 119 | 119 | 120 | 108 | 98 | 100 |
| *Melt visc. at 320° C.* | | | | | | | |
| eta 100 | Pa · s | 203 | 198 | 202 | | 141 | |
| eta 200 | Pa · s | 202 | 195 | 199 | 154 | 139 | 138 |
| eta 500 | Pa · s | 190 | 184 | 185 | 149 | 137 | 133 |
| eta 1000 | Pa · s | 170 | 164 | 167 | 138 | 127 | 123 |
| eta 1500 | Pa · s | 154 | 149 | 152 | 127 | 118 | 114 |
| eta 5000 | Pa · s | 93 | 90 | 92 | 81 | 77 | 75 |
| *Melt visc. at 340° C.* | | | | | | | |
| eta 200 | Pa · s | 123 | 103 | 108 | 89 | 83 | 76 |
| eta 500 | Pa · s | 119 | 101 | 106 | 87 | 82 | 75 |
| eta 1000 | Pa · s | 111 | 95 | 99 | 84 | 79 | 72 |
| eta 1500 | Pa · s | 104 | 88 | 92 | 80 | 75 | 69 |
| eta 5000 | Pa · s | 70 | 62 | 64 | 59 | 60 | 52 |
| Impact resistance ISO180/1° C. | kJ/m² | 7 × n.f. 3 × 243s | n.f. | n.f. | n.f. | n.f. | n.f. | n.f.: no fracture (no value, since no fracture)

It is apparent from the table that the compositions according to the comparative examples that do not contain any polyglycidyl ether have a much poorer melt volume flow rate MVR. The flow curves of the compositions according to the invention each show distinctly reduced melt viscosities over the entire shear range at different measurement temperatures, which means improved flowability. The effects on glass transition temperature are insignificant in this case. Impact resistance is unchanged and good.

The invention claimed is:

1. A composition comprising
A) 64.0-99.94 wt % of aromatic polycarbonate and
B) 0.05 to 3.0 wt % of at least one polyglycidyl ether compound of the formula (1)

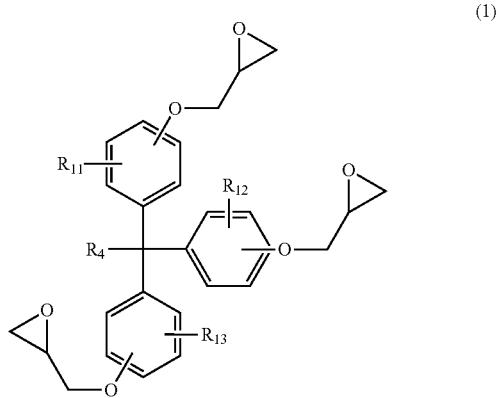

(1)

in which $R_4$ is a $C_1$- to $C_8$-alkyl group or an aryl group, where the alkyl group is branched or unbranched, and $R_{11}$ to $R_{13}$ are the same or different and are H, $C_1$- to $C_8$-alkyl radicals or aryl radicals, where the alkyl radicals are branched or unbranched.

2. The composition according to claim 1, wherein the amount of the polyglycidyl ether compound is 0.1 to 0.6 wt %.

3. The composition according to claim 1, wherein the polyglycidyl ether compound of the formula (1) present, alone or in a mixture with other polyglycidyl ethers of the formula (1), is the trisglycidyl ether of 1,1,1-tris(p-hydroxyphenyl)ethane of the formula (2)

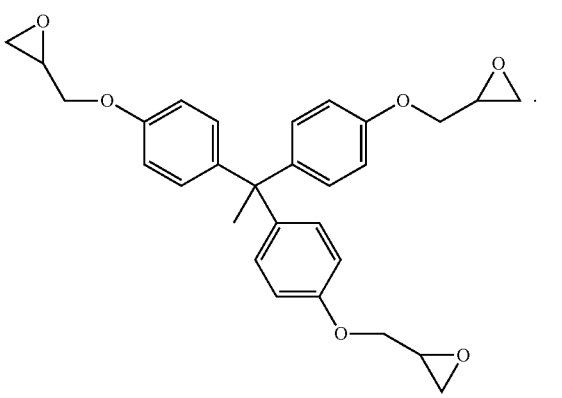

(2)

4. The composition according to claim 1, further comprising 0.001 wt % to 3 wt % of at least one additive from the group of the thermal stabilizers, UV stabilizers and/or demoulding agents.

5. The composition according to claim 1, consisting of the following components:
A) 64.0-99.94 wt % of aromatic polycarbonate,
B) 0.05 to 3.0 wt % of polyglycidyl ether of the formula (1)
C) 0.001 wt % to 3 wt % of at least one additive selected from the groups of the thermal stabilizers, UV stabilizers and demoulding agents, and
D) 0.0 wt % to 30.0 wt % of one or more further additives selected from the groups of the flame retardants, IR absorbers, antistats and inorganic fillers.

6. A moulding produced from the composition according to claim 1.

7. The moulding according to claim 6, wherein the moulding has a thickness of 0.1 to 3 mm.

8. The moulding according to claim 7, wherein the moulding has a thickness of 0.1 to 2 mm.

9. Moulding according to claim 8, wherein the moulding has a thickness of 0.1 to 1.0 mm.

10. A method comprising utilizing at least one polyglycidyl ether compound of the formula (1)

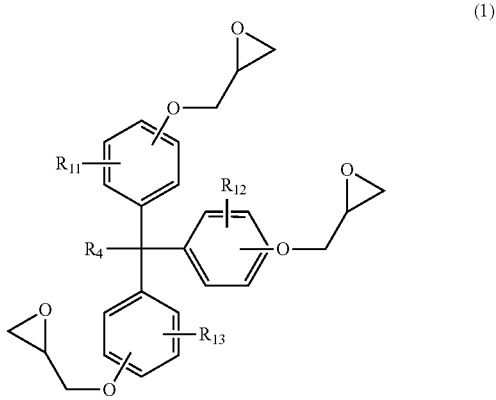

(1)

in which $R_4$ is a $C_1$- to $C_8$-alkyl group or an aryl group, where the alkyl group is branched or unbranched, and $R_{11}$ to $R_{13}$ are the same or different and are H, $C_1$- to $C_8$-alkyl radicals or aryl radicals, where the alkyl radicals are branched or unbranched, for increasing the melt volume flow rate, determined according to ISO 1133-1:2011-12 at 300° C. with a 1.2 kg load, of a polycarbonate composition.

11. The method according to claim 10, wherein the polyglycidyl ether compound of the formula (1) present, alone or in a mixture with other polyglycidyl ethers of the formula (1), is the trisglycidyl ether of 1,1,1-tris(p-hydroxyphenyl)ethane of the formula (2)

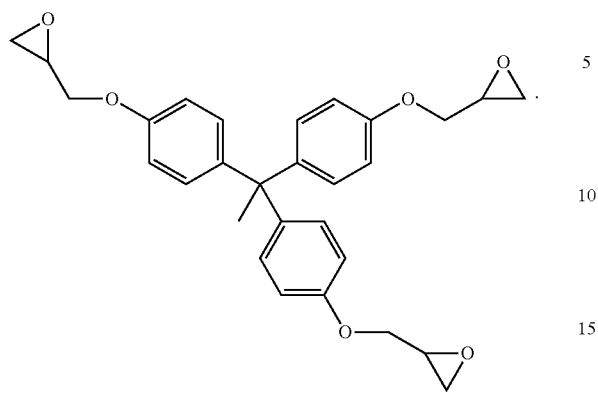
(2)
* * * * *